(12) United States Patent
Lei et al.

(10) Patent No.: US 11,579,120 B2
(45) Date of Patent: Feb. 14, 2023

(54) COLORED DEFECT DETECTION CURVES

(71) Applicant: Baker Hughes Oilfield Operations LLC, Houston, TX (US)

(72) Inventors: Jiamin Lei, Shanghai (CN); Siva Sankar Yadavalli, Bengaluru (IN)

(73) Assignee: Baker Hughes Oilfield Operations LLC, Houston, TX (US)

( * ) Notice: Subject to any disclaimer, the term of this patent is extended or adjusted under 35 U.S.C. 154(b) by 35 days.

(21) Appl. No.: 17/205,550

(22) Filed: Mar. 18, 2021

(65) Prior Publication Data

US 2021/0310992 A1 Oct. 7, 2021

Related U.S. Application Data

(60) Provisional application No. 63/004,865, filed on Apr. 3, 2020.

(51) Int. Cl.
*G01N 29/06* (2006.01)

(52) U.S. Cl.
CPC ..... *G01N 29/0618* (2013.01); *G01N 29/0645* (2013.01); *G01N 29/0654* (2013.01); *G01N 2291/044* (2013.01)

(58) Field of Classification Search
CPC .......... G01N 29/0618; G01N 29/0645; G01N 29/0654; G01N 2291/044; G01N 29/2481; G01N 2291/0289; G01N 2291/2696; G01N 29/0609; G01N 29/11; G01N 29/069
See application file for complete search history.

(56) References Cited

U.S. PATENT DOCUMENTS 5,750,895 A * 5/1998 Chern ................ G01N 29/0645
73/629
2018/0106765 A1* 4/2018 Kim ..................... G01N 29/043

OTHER PUBLICATIONS

"Enhanced Ultrasonic Flaw Detection Using an Ultrahigh Gain and Time-Dependent Threshold", Song et al., see attached publication. (Year: 2018).*

* cited by examiner

*Primary Examiner* — Xin Y Zhong
(74) *Attorney, Agent, or Firm* — Mintz Levin Cohn Ferris Glovsky and Popeo, PC

(57) ABSTRACT

A method includes receiving data characterizing a first acoustic signal reflected by a first defect in a target object, and a first depth of the first defect relative to a surface of the target object. The first acoustic signal is detected by a detector located at a first location on the surface of the target object. The method also includes assigning a defect color to the received data based on an amplitude value associated with the first acoustic signal and one or more of a first predetermined threshold value and a second predetermined threshold value associated with the first depth. The method further includes rendering, in a graphical user interface display space, a first visual representation of the first acoustic signal in a graph including a first axis indicative of target object defect depth and a second axis indicative of amplitudes of acoustic signals detected by the detector. The first visual representation of the first acoustic signal includes the assigned defect color.

21 Claims, 3 Drawing Sheets

US 11,579,120 B2

COLORED DEFECT DETECTION CURVES

RELATED APPLICATION

This application claims priority under 35 U.S.C. § 119(e) to U.S. Provisional Patent Application No. 63/004,865 filed on Apr. 3, 2020, the entire content of which is hereby expressly incorporated by reference herein.

BACKGROUND

Non-destructive testing (NDT) is a class of analytical techniques that can be used to inspect a target, without causing damage, to ensure that the inspected target meets required specifications. For this reason, NDT has found wide acceptance in industries such as aerospace, power generation, oil and gas transport or refining, and transportation, that employ structures that are not easily removed from their surroundings.

In ultrasonic testing, acoustic (sound) energy in the form of waves can be directed towards a target object (e.g., train wheel). As the ultrasonic waves contact and penetrate the train wheel, they can reflect from features such as outer surfaces and interior defects (e.g., cracks, porosity, etc.). An ultrasonic sensor can acquire ultrasonic measurements of acoustic strength as a function of time. Subsequently, these ultrasonic measurements can be analyzed to provide testing results that characterize defects present within a train wheel, such as their presence or absence, location, and/or size.

SUMMARY

Various aspects of the disclosed subject matter may provide one or more of the following capabilities.

A method includes receiving data characterizing a first acoustic signal reflected by a first defect in a target object, and a first depth of the first defect relative to a surface of the target object. The first acoustic signal is detected by a detector located at a first location on the surface of the target object. The method also includes assigning a defect color to the received data based on an amplitude value associated with the first acoustic signal and one or more of a first predetermined threshold value and a second predetermined threshold value associated with the first depth. The method further includes rendering, in a graphical user interface display space, a first visual representation of the first acoustic signal in a graph including a first axis indicative of target object defect depth and a second axis indicative of amplitudes of acoustic signals detected by the detector. The first visual representation of the first acoustic signal includes the assigned defect color.

One or more of the following features can be included in any feasible combination.

In one implementation, the method further includes receiving a first set of predetermined threshold values associated with a plurality of depths in the target object. The first set of predetermined threshold values include the first predetermined threshold value. The method also includes rendering, in the graph in the graphical user interface display space, a first evaluation curve of the first set of predetermined threshold values versus the plurality of depths in the target object.

In one implementation, the method further includes receiving a second set of predetermined threshold values associated with the plurality of depths in the target object. The second set of predetermined threshold values includes the second predetermined threshold value. The method also includes rendering, in the graph in the graphical user interface display space, a second evaluation curve of the second set of predetermined threshold values versus the plurality of depths in the target object. In another implementation, the assigned defect color is a first color when the amplitude value associated with the first acoustic signal is between the first predetermined threshold value and the second predetermined threshold value. The second predetermined threshold value is greater than the first predetermined threshold value.

In one implementation, the assigned defect color is a second color when the amplitude value associated with the first acoustic signal is greater than the second predetermined threshold value. In another implementation, the amplitude value of the first acoustic signal is indicative of a size of the first defect. Assignment of the first color is indicative of an acceptable size of the of the first defect, and assignment of the second color is indicative of an unacceptable size of the first defect.

In one implementation, the method further includes receiving data characterizing a second acoustic signal reflected by a second defect in the target object, and a second depth of the second defect relative to the surface of the target object. The second acoustic signal is detected by the detector located at a second location on the surface of the target object. The method further includes assigning a second defect color to the received data characterizing the second acoustic signal based on a second amplitude value associated with the second acoustic signal and one or more of a third predetermined threshold value and a fourth predetermined threshold value associated with the second depth. The method also includes rendering, in the graphical user interface display space, a second visual representation of the second acoustic signal in the graph, wherein the second visual representation of the second acoustic signal includes the assigned second defect color.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings. The patent or application file contains at least one drawing executed in color. Copies of this patent or patent application publication with color drawings will be provided by the Office upon request and payment of the necessary fee.

DETAILED DESCRIPTION

Objects in industrial processes can develop defects, such as cracks and damages, over time during use. The defects can increase in size over a period of time, which can be undesirable (e.g., leading to down time, injury, etc.). This can be avoided by periodic inspection. In some cases, the defects can be located beneath the surface of the object ("target object) and may not be visible. Such defects can be detected using ultrasonic testing. In ultrasonic testing, ultrasonic probes can be positioned on the target object which can transmit acoustic signal (or ultrasonic waves) in the target object and detect a portion of the transmitted acoustic signal reflected by the defect (also referred to as "echo"). Echo can be indicative of various properties of the defect (e.g., location of the defect, size of the defect, etc.). A visual representation of the information associated with the echo can be rendered in a graphical user interface (GUI) display space. This visual representation is referred to as defect detection curve or "A-scan" curve. For example, the amplitude of the echo (indicative of size of the defect) can be plotted as a function of the depth of the defect associated with the echo. The aforementioned plot in the GUI display space can be updated when a new echo is detected (e.g., a new echo associated with the same or a different defect detected in real-time). In some cases, the update rate can be high (e.g., 60 Hz) which can make it challenging for a user to keep track of defect properties (e.g., defect size) presented in the plot. Accordingly, defect detection systems with improved visual representation of defect information are described. The improved visual representation with color-coded defect detection curves can allow the user to quickly and efficiently discern undesirable defects.

Figure 1:
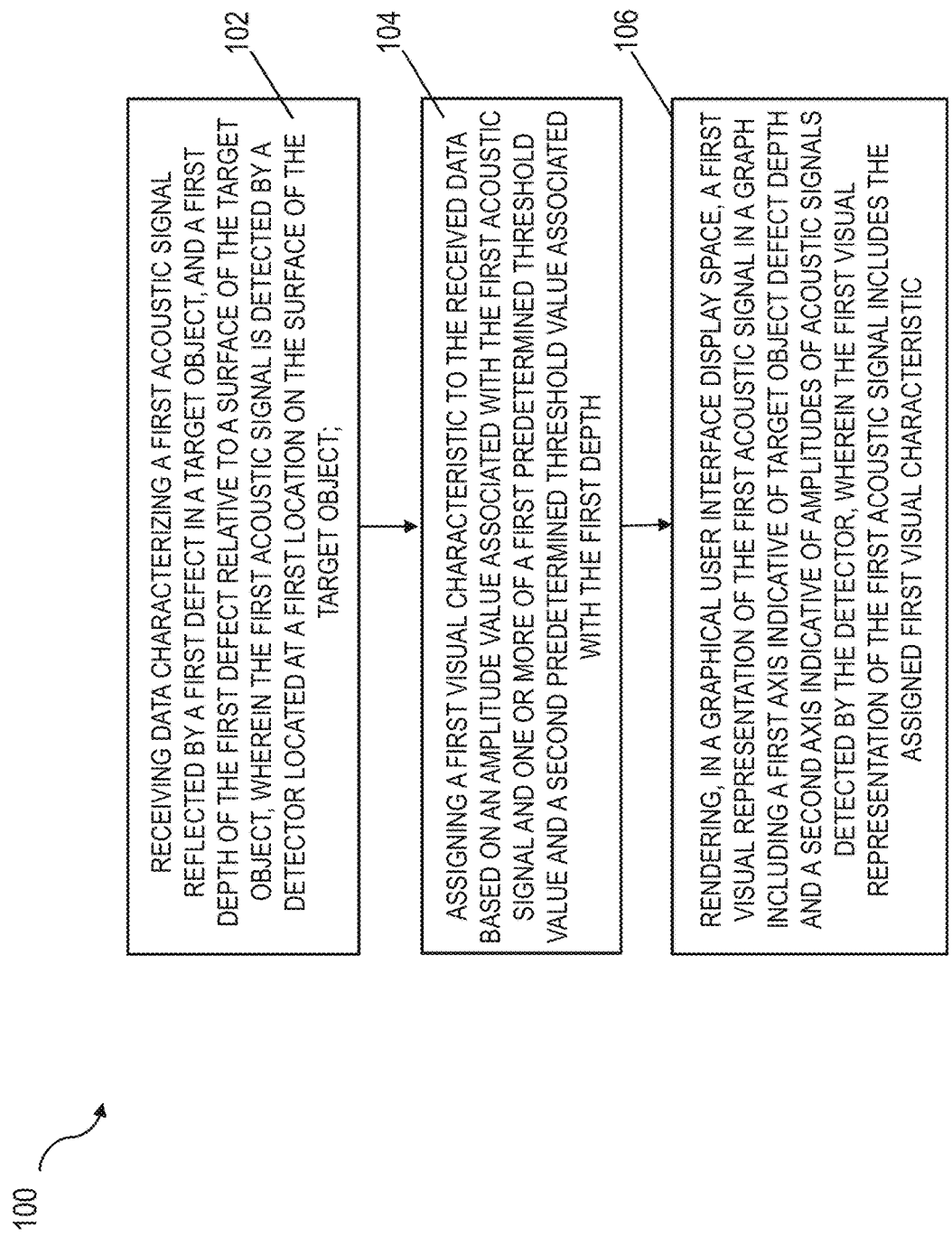
FIG. 1 is a flow chart of an exemplary method for detecting and displaying defect detection curves associated with defects in a target object.
Figure 2:
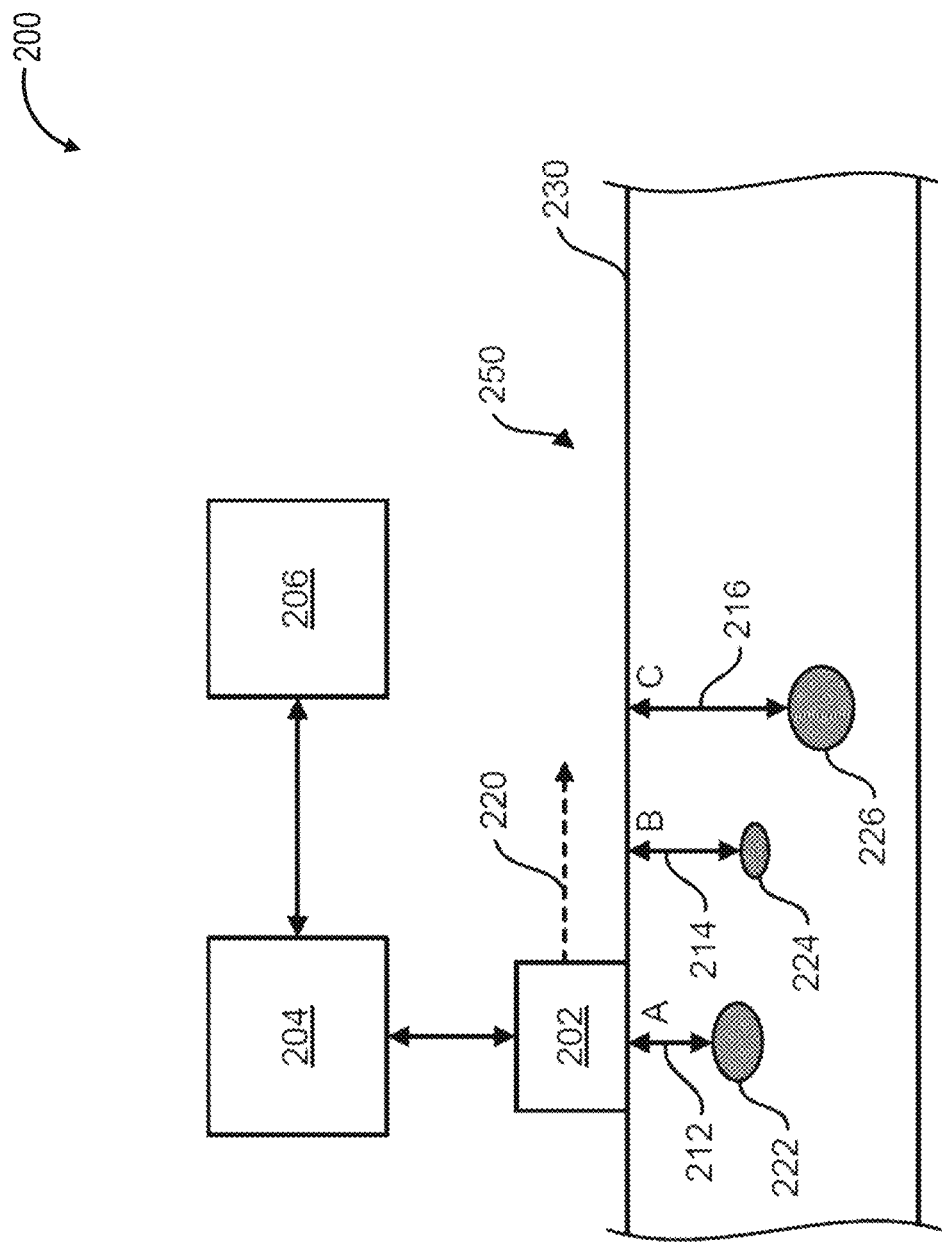
FIG. 2 is a schematic illustration of an acoustic detection system that can detect defects in the target object.

FIG. 1 is a flow chart of an exemplary method for detecting and displaying defect detection curves associated with defects in a target object. At 102, data characterizing a first acoustic signal reflected by a first defect in the target object is received (e.g., by a computing device). The received data can include a first depth of the first defect relative to a surface of the target object. FIG. 2 is a schematic illustration of an acoustic detection system 200 that can detect defects in the target object 250. The detection system 200 can include a detector 202 configured to transmit an acoustic signal into the target object 250 and detect a reflection of the transmitted acoustic signal from defects (e.g., defects 222-226) in the target object 250.

The detector 202 can be configured to move along the surface 230 of the target object 250. For example, the detector 202 can move along the direction 220 to locations A, B and C on the surface 230. At each of these locations, the detector 202 can perform one or more defect detection in the target object 250 by emission of an acoustic signal and detection of a reflection of the acoustic signal (or a portion thereof) by a defect (e.g., defect 222-226). For example, the detector 202 can be positioned at location "A" and configured to transmit an acoustic signal into the target object 250. The defect 222 located at a depth 212 (relative to the surface 230) can reflect a portion of the acoustic signal which can be detected by the detector 202.

The defects 222-226 can be of different sizes and can be located at different depths. The detector can determine the size and depth of the defect based on the amplitude (or intensity) of the detected signal (or echo) and the time between the transmission of acoustic signal and detection of the echo. For example, the time between the transmission of acoustic signal and detection of the corresponding echo ("travel time") can be indicative of defect depth (e.g., depth 212 of defect 222, depth 214 of defect 224, and depth 216 of defect 226, etc.). Defect depth can be determined by multiplying the speed of acoustic signal in the target object with the travel time. The amplitude of the echo can be related to the size of the defect and the defect depth. The echo amplitude can be directly proportional to the size of the defect and inversely proportional to the defect depth. In other words, for a given depth, the echo amplitude increases as the size of the defect increases. On the other hand, for a given size of the defect, the echo amplitude decreases as the defect depth increases.

The detection system 200 can also include a computing device 204 communicatively coupled to the detector 202. The computing device 204 can receive data characterizing the acoustic signal (e.g., echo amplitude, travel time, defect depth etc.) detected by the detector 202. In some implementations, the computing device 204 can receive data characterizing multiple echo detections. For example, the detector 202 can be moved to a new location "B" and configured to transmit an acoustic signal into the target object 250. The defect 224 located at a depth 214 (relative to the surface 230) can reflect a corresponding second echo which can be detected by the detector 202. The computing device 204 can receive data characterizing the second echo (e.g., echo amplitude, travel time, defect depth etc.) associated with the defect 224 and detected by the detector 202.

Data characterizing the acoustic signal of the echo received at step 102 can be compared to a database of previously detected echo data. The echo data can include echo amplitudes for defects of various sizes located at various depths. For example, echo data can include a two dimensional matrix where a first dimension represents defect depths and the second dimension represents defect size. The echo data can be generated by performing detection of defects in a test object (e.g., made of the same material as the target object 250) that includes predetermined defects of various sizes located at various depths. For example, the echo data can include a first set of predetermined echo amplitudes (or intensities) associated with a defect of a first size (e.g., a first volume, radius, shape, etc.) located at various depths. The echo data can also include a second set of predetermined echo amplitudes (or intensities) associated with a defect of a second size (e.g., a first volume, radius, shape, etc.) located at various depths. The database of echo data can be stored, for example, in a memory of the computing device 204. Alternately or additionally, the echo data can be remotely stored (e.g., in a server, cloud, etc.), and the computing device 202 can access and receive the echo data from the remotely stored memory.

At 104, the computing device 204 can assign a defect color to the received data based on an amplitude value associated with the first acoustic signal. The computing device 204 can compare the detected echo amplitude (received at step 102) with the predetermined echo amplitudes in the echo database. For example, the detected echo amplitude in the first acoustic signal can be compared with predetermined echo amplitude values associated with defects located at the first defect depth associated with the first acoustic signal (or located within a predetermined ranged of depths that includes the first depth). For example, the detected echo amplitude can be compared with one or more of a first predetermined echo amplitude value in the first set of predetermined echo amplitudes (e.g., associated with a first defect size), a second predetermined echo amplitude in the second set of predetermined echo amplitudes, etc. Based on the value of the detected echo amplitude relative to the predetermined echo amplitudes (having the same or similar depth as the defect associated with detected echo amplitude), a defect color can be assigned to the received data.

Figure 3:
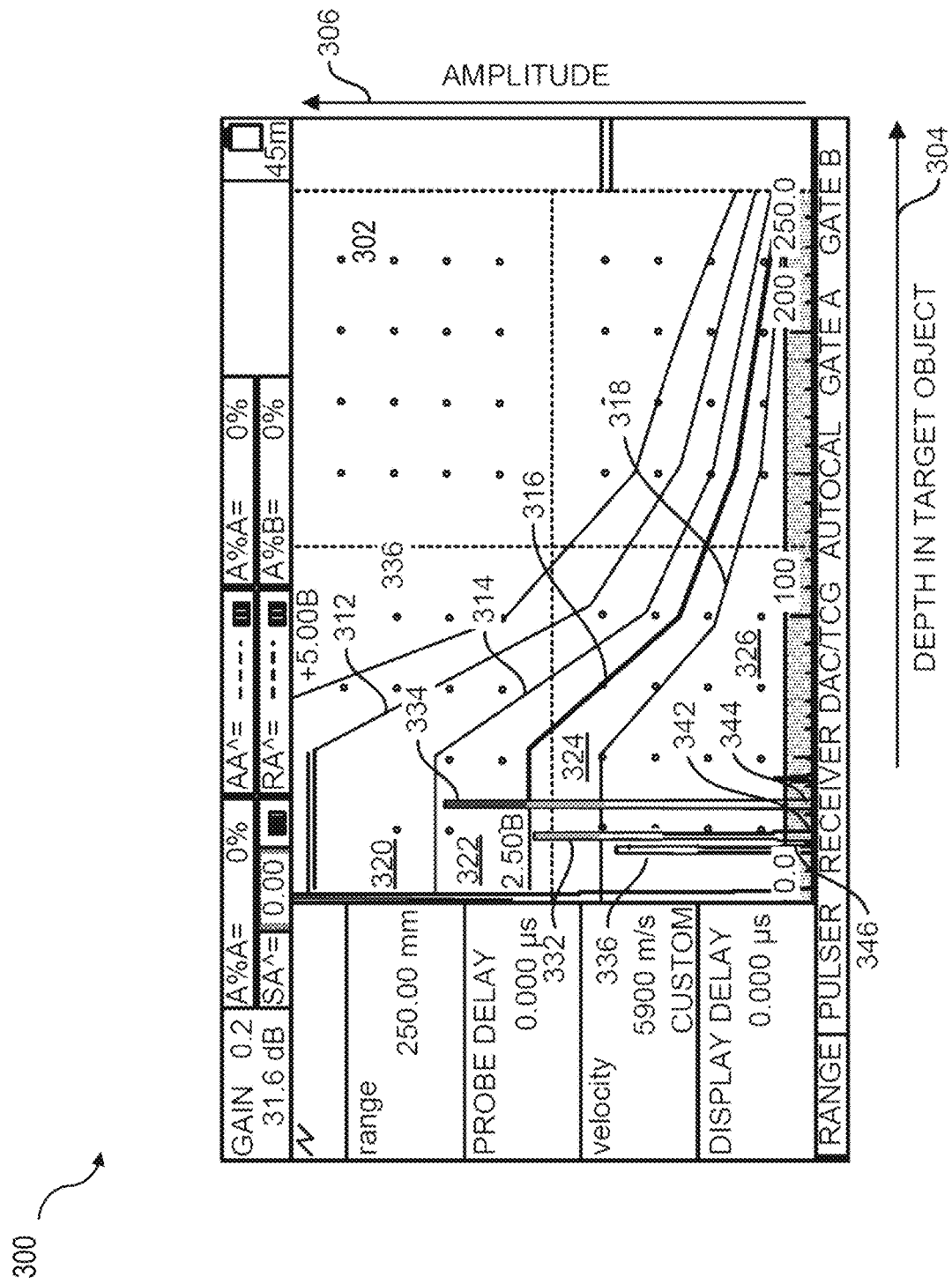
FIG. 3 illustrates an exemplary graphical user interface (GUI) display of the detection system in FIG. 2 configured to render defect detection curves.

At 106, a first visual representation of the first acoustic signal (also referred to as defect detection curves) can be rendered in a graphical user interface display space. FIG. 3 illustrates an exemplary graphical user interface (GUI) display space 300 of the detection system. The GUI display space 300 can be rendered, for example, in a user device 206 communicatively coupled to the computing device 204. The GUI display space 300 can include a graph 302 having a first axis 304 indicative of defect depth and a second axis 306 indicative of amplitudes of acoustic signals detected by the detector 202. The graph 302 includes evaluation curves 312-318, where each evaluation curve is associated with predetermined echo amplitudes of defects of a given size as a function of defect depths. The first evaluation curve 312 can be representative of predetermined echo amplitude of defects having a first size, the second evaluation curve 314 can be representative of predetermined echo amplitude of defects having a second size, the second evaluation curve 316 can be representative of predetermined echo amplitude of defects having a third size, etc.

The predetermined echo amplitudes can decrease as the defect depth increases and increase as the defect size increases. For example, the defects associated with the evaluation curve 312 can be larger than the defects associated with evaluation curve 314, which in turn can be larger than the defects associated with evaluation curve 316. The defects associated with the evaluation curve 316 can be larger than the defects associated with evaluation curve 318. The evaluation curves 312-318 can divide the graph 312 into regions 320-326 that are indicative of different range of echo amplitudes for the various depths. For example, region 326 can be representative of an acceptable defect size. In other words, the defects that generate an echo with amplitude in the region 326 may be considered acceptable (e.g., not a threat to the integrity of the target object 250). Defects that generate an echo with an amplitude in the region 324 may be considered acceptable. However, these defects may grow larger in the future to an unacceptable size and therefore may require additional monitoring (e.g., monitoring on a regular basis). Defects that generate an echo with an amplitude in the region 322 may be considered unacceptable. It may be desirable for the user (e.g., monitoring personnel) to review these defects to ensure that the usage of the target object is safe. Defect that generate an echo with an amplitude in the region 320 may be considered dangerous. It may be desirable to immediately suspend the industrial process involving the target object 250.

During inspection of the target object 250, the detector 202 can transmit multiple acoustic signals into the target object 250. For example, multiple acoustic signals can be transmitted at a given location on the surface of the target object, or at multiple locations on the surface of the target object (e.g., when the detector 202 is translated over the surface of the target object 250). The detector 202 can detect multiple echo corresponding to the transmitted signals. Visual representations of the echo signal (or defect detection curves/A-scan curves) can be presented in the graph 302 of the GUI display space 300 (e.g., in real-time). In some implementations, the visual representations may be rapidly generated and the user may not be able to discern if the defects associated with the visual representation require additional attention (e.g., need to be monitored, are considered unacceptable, are considered dangerous, etc.). Therefore, it can be desirable to color code the visual representation which can facilitate fast and efficient detection by the user.

The color of the visual representation (or a portion thereof) of the first acoustic signal can be based on the location of the peak of the first visual representation of the first acoustic signal and/or the regions of the graph that overlap with the visual representation. For example, as illustrated in FIG. 3, the first visual representation 332 is assigned an orange color (e.g., associated with the region 324) which can indicate that the defect associated with the first visual representation 332 has an acceptable size. A second visual representation 334 associated with a second defect is assigned a maroon color (e.g., associated with the region 322) which can indicate that the second defect has an unacceptable size. A third visual representation 336 associated with a third defect is assigned a white color (e.g., associated with the region 326) which can indicate that the third defect has an acceptable size and is not at a risk of having unacceptable size in near future. The assignment of the color can be predetermined (e.g., based on the region (e.g., regions 320-326) demarcated by the evaluation curves (e.g., evaluation curve 312-318) that are associated with defects of various sizes. In some implementations, a visual representation can be assigned multiple colors based on the regions that overlap with the curve. For example, a first portion of the visual representation 334 in the region 326 can be assigned white color associated with the region 326; a second portion of the visual representation 334 in the region 324 can be assigned orange color associated with the region 326; and a third portion of the visual representation 334 in the region 322 can be assigned maroon color associated with the region 322.

As illustrated in FIG. 3, the first defect associated with the first visual representation is located at the first depth 342, the second defect associated with the second visual representation is located at the second depth 344 and the third defect associated with the third visual representation is located at the third depth 346. The peak of the first visual representation 332 is located between the evaluation curves 316 and 318. This indicates that the size of the first defect is between the sizes of the predetermined defects associated with evaluation curve 316 and the predetermined defects associated with evaluation curve 318. The peak of the second visual representation 334 is located between the evaluation curves 314 and 316. This indicates that the size of the second defect is between the sizes of the predetermined defects associated with evaluation curve 314 and the predetermined defects associated with evaluation curve 316. The peak of the third visual representation 336 is located beneath the evaluation curve 318. This indicates that the size of the third defect is less than the size of the predetermined defects associated with evaluation curve 318.

Other embodiments are within the scope and spirit of the disclosed subject matter. For example, the monitoring system described in this application can be used in facilities that have complex machines with multiple operational parameters that need to be altered to change the performance of the machines (e.g., power generating turbines). Usage of the word "optimize"/"optimizing" in this application can imply "improve"/"improving."

Certain exemplary embodiments are described herein to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A computer-implemented method comprising:
   receiving data characterizing a first acoustic signal reflected by a first defect in a target object, and a first depth of the first defect relative to a surface of the target object,
      wherein the first acoustic signal is detected by a detector located at a first location on the surface of the target object;
   comparing the first acoustic signal reflected by the first defect in the target object to a previously detected acoustic signal reflected by the first defect in the target object to determine a change in size of the first defect in the target object;
   assigning a defect color to the data based on an amplitude value associated with the first acoustic signal relative to a predetermined amplitude of the previously detected acoustic signal and one or more of a first predetermined threshold value and a second predetermined threshold value associated with the first depth; and
   rendering, in a graphical user interface display space, a first visual representation of the first acoustic signal in a graph comprising a first axis indicative of target object defect depth and a second axis indicative of amplitudes of acoustic signals detected by the detector, wherein the first visual representation of the first acoustic signal comprises the defect color associated with the first acoustic signal relative to the previously detected acoustic signal.

2. The computer-implemented method of claim 1, further comprising:
   receiving a first set of predetermined threshold values associated with a plurality of depths in the target object, the first set of predetermined threshold values comprises the first predetermined threshold value; and
   rendering, in the graph in the graphical user interface display space, a first evaluation curve of the first set of predetermined threshold values versus the plurality of depths in the target object.

3. The computer-implemented method of claim 2, further comprising:
   receiving a second set of predetermined threshold values associated with the plurality of depths in the target object, the second set of predetermined threshold values comprises the second predetermined threshold value; and
   rendering, in the graph in the graphical user interface display space, a second evaluation curve of the second set of predetermined threshold values versus the plurality of depths in the target object.

4. The computer-implemented method of claim 3, wherein the defect color is a first color when the amplitude value associated with the first acoustic signal is between the first predetermined threshold value and the second predetermined threshold value, wherein the second predetermined threshold value is greater than the first predetermined threshold value.

5. The computer-implemented method of claim 4, wherein the defect color is a second color when the amplitude value associated with the first acoustic signal is greater than the second predetermined threshold value.

6. The computer-implemented method of claim 5, wherein the amplitude value of the first acoustic signal is indicative of a size of the first defect, and
   wherein assignment of the first color is indicative of an acceptable size of the of the first defect, and assignment of the second color is indicative of an unacceptable size of the first defect.

7. The computer-implemented method of claim 6, further comprising:
   receiving data characterizing a second acoustic signal reflected by a second defect in the target object, and a second depth of the second defect relative to the surface of the target object, wherein the second acoustic signal is detected by the detector located at a second location on the surface of the target object;
   assigning a second defect color to the data characterizing the second acoustic signal based on a second amplitude value associated with the second acoustic signal and one or more of a third predetermined threshold value and a fourth predetermined threshold value associated with the second depth; and
   rendering, in the graphical user interface display space, a second visual representation of the second acoustic signal in the graph, wherein the second visual representation of the second acoustic signal comprises the second defect color.

8. A system comprising:
   at least one data processor;
   memory coupled to the at least one data processor, the memory storing instructions to cause the at least one data processor to perform operations comprising:
      receiving data characterizing a first acoustic signal reflected by a first defect in a target object, and a first depth of the first defect relative to a surface of the target object, wherein the first acoustic signal is detected by a detector located at a first location on the surface of the target object;
      comparing the first acoustic signal reflected by the first defect in the target object to a previously detected acoustic signal reflected by the first defect in the target object to determine a change in size of the first defect in the target object;
      assigning a defect color to the data based on an amplitude value associated with the first acoustic signal relative to a predetermined amplitude of the previously detected acoustic signal and one or more of a first predetermined threshold value and a second predetermined threshold value associated with the first depth; and
      rendering, in a graphical user interface display space, a first visual representation of the first acoustic signal in a graph comprising a first axis indicative of target object defect depth and a second axis indicative of amplitudes of acoustic signals detected by the detector, wherein the first visual representation of the first acoustic signal comprises the defect color associated with the first acoustic signal relative to the previously detected acoustic signal.

9. The system of claim 8, wherein the operations further comprise:

receiving a first set of predetermined threshold values associated with a plurality of depths in the target object, the first set of predetermined threshold values comprises the first predetermined threshold value; and rendering, in the graph in the graphical user interface display space, a first evaluation curve of the first set of predetermined threshold values versus the plurality of depths in the target object.

10. The system of claim 9, wherein the operations further comprise:

receiving a second set of predetermined threshold values associated with the plurality of depths in the target object, the second set of predetermined threshold values comprises the second predetermined threshold value; and rendering, in the graph in the graphical user interface display space, a second evaluation curve of the second set of predetermined threshold values versus the plurality of depths in the target object.

11. The system of claim 10, wherein the defect color is a first color when the amplitude value associated with the first acoustic signal is between the first predetermined threshold value and the second predetermined threshold value, wherein the second predetermined threshold value is greater than the first predetermined threshold value.

12. The system of claim 11, wherein the defect color is a second color when the amplitude value associated with the first acoustic signal is greater than the second predetermined threshold value.

13. The system of claim 12, wherein the amplitude value of the first acoustic signal is indicative of a size of the first defect, and wherein assignment of the first color is indicative of an acceptable size of the of the first defect, and assignment of the second color is indicative of an unacceptable size of the first defect.

14. The system of claim 13, wherein the operations further comprise:

receiving data characterizing a second acoustic signal reflected by a second defect in the target object, and a second depth of the second defect relative to the surface of the target object, wherein the second acoustic signal is detected by the detector located at a second location on the surface of the target object;

assigning a second defect color to the data characterizing the second acoustic signal based on a second amplitude value associated with the second acoustic signal and one or more of a third predetermined threshold value and a fourth predetermined threshold value associated with the second depth; and rendering, in the graphical user interface display space, a second visual representation of the second acoustic signal in the graph, wherein the second visual representation of the second acoustic signal comprises the second defect color.

15. A computer program product comprising a non-transitory machine-readable medium storing instructions that, when executed by at least one programmable processor, cause the at least one programmable processor to perform operations comprising:

receiving data characterizing a first acoustic signal reflected by a first defect in a target object, and a first depth of the first defect relative to a surface of the target object, wherein the first acoustic signal is detected by a detector located at a first location on the surface of the target object;

comparing the first acoustic signal reflected by the first defect in the target object to a previously detected acoustic signal reflected by the first defect in the target object to determine a change in size of the first defect in the target object;

assigning a defect color to the data based on an amplitude value associated with the first acoustic signal relative to a predetermined amplitude of the previously detected acoustic signal and one or more of a first predetermined threshold value and a second predetermined threshold value associated with the first depth; and rendering, in a graphical user interface display space, a first visual representation of the first acoustic signal in a graph comprising a first axis indicative of target object defect depth and a second axis indicative of amplitudes of acoustic signals detected by the detector, wherein the first visual representation of the first acoustic signal comprises the defect color associated with the first acoustic signal relative to the previously detected acoustic signal.

16. The computer program product of claim 15, wherein the operations further comprise:

receiving a first set of predetermined threshold values associated with a plurality of depths in the target object, the first set of predetermined threshold values comprises the first predetermined threshold value; and rendering, in the graph in the graphical user interface display space, a first evaluation curve of the first set of predetermined threshold values versus the plurality of depths in the target object.

17. The computer program product of claim 16, wherein the operations further comprise:

receiving a second set of predetermined threshold values associated with the plurality of depths in the target object, the second set of predetermined threshold values comprises the second predetermined threshold value; and rendering, in the graph in the graphical user interface display space, a second evaluation curve of the second set of predetermined threshold values versus the plurality of depths in the target object.

18. The computer program product of claim 17, wherein the defect color is a first color when the amplitude value associated with the first acoustic signal is between the first predetermined threshold value and the second predetermined threshold value, wherein the second predetermined threshold value is greater than the first predetermined threshold value.

19. The computer program product of claim 18, wherein the defect color is a second color when the amplitude value associated with the first acoustic signal is greater than the second predetermined threshold value.

20. The computer program product of claim 19, wherein the amplitude value of the first acoustic signal is indicative of a size of the first defect, and wherein assignment of the first color is indicative of an acceptable size of the of the first defect, and assignment of the second color is indicative of an unacceptable size of the first defect.

21. The computer program product of claim 20, wherein the operations further comprise:

receiving data characterizing a second acoustic signal reflected by a second defect in the target object, and a second depth of the second defect relative to the surface of the target object, wherein the second acoustic signal is detected by the detector located at a second location on the surface of the target object;

assigning a second defect color to the data characterizing the second acoustic signal based on a second amplitude value associated with the second acoustic signal and one or more of a third predetermined threshold value and a fourth predetermined threshold value associated with the second depth; and rendering, in the graphical user interface display space, a second visual representation of the second acoustic signal in the graph, wherein the second visual representation of the second acoustic signal comprises the second defect color.

\* \* \* \* \*